(12) United States Patent
Fraisse

(10) Patent No.: US 9,235,671 B1
(45) Date of Patent: Jan. 12, 2016

(54) COMBINING LOGIC ELEMENTS INTO PAIRS IN A CIRCUIT DESIGN SYSTEM

(71) Applicant: Xilinx, Inc., San Jose, CA (US)

(72) Inventor: Henri Fraisse, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/460,309

(22) Filed: Aug. 14, 2014

(51) Int. Cl.
 *G06F 17/50* (2006.01)
(52) U.S. Cl.
 CPC .......... *G06F 17/505* (2013.01); *G06F 2217/06* (2013.01)
(58) Field of Classification Search
 CPC G06F 17/505; G06F 15/5072; G06F 17/5077
 USPC ......................................... 716/101, 104, 105
 See application file for complete search history.

(56) References Cited

U.S. PATENT DOCUMENTS

| 7,237,214 | B1 * | 6/2007 | Pandey et al. | .................. 716/131 |
| 7,844,930 | B2 * | 11/2010 | Pandey et al. | .................. 716/113 |
| 8,176,452 | B2 * | 5/2012 | Pandey et al. | .................. 716/105 |
| 8,458,639 | B2 * | 6/2013 | Pandey et al. | .................. 716/122 |
| 9,038,013 | B2 * | 5/2015 | Pandey et al. | .................. 716/129 |

OTHER PUBLICATIONS

Ahmed, T. et al., "Packing Techniques for Virtex-5 FPGAs", ACM Transactions on Reconfigurable Technology and Systems, vol. 2, No. 3, Article 18, Sep. 2009, pp. 18-18:24, Xilinx, Inc., San Jose, CA USA.
Altera Corporation, "FPGA Architecture", white paper WP-01003-1.0, Jul. 2006, Ver.1.0, pp. 1-14, San Jose, CA USA.
Chikodikar, Madhav, Y., et al., "A Technology Mapper for Xilinx FPGAs", 10th International Conference on VLSI Design, Jan. 4-7, 1997, pp. 57-61, Hyderabad, India.
Edmonds, Jack, "Maximum matching and a polyhedron with 0-1 vertices", Dec. 1, 1964, Journal of Research at the National Bureau of Standards, vol. 69B, 1 and 2, 125-130, Jan.-Jun. 1965.
Edmonds, Jack, "Path, trees, and flowers", Canadian J. Math, 17:449-467, 1965.
Kolmogorov, Vladimir, "Blossom V: A new implementation of a minimum cost perfect matching algorithm", Mathematical Programming Computation, Jul. 1, 2009, vol. 1, Issue 1, pp. 43-67, London, UK., Springer-Verlag.

* cited by examiner

*Primary Examiner* — Sun Lin
(74) *Attorney, Agent, or Firm* — Robert M. Brush

(57) ABSTRACT

In an example implementation, a method of implementing a circuit design for an integrated circuit (IC), includes: on at least one programmed processor, performing operations including: processing a description of the circuit design having logic elements into a graph having nodes representing the logic elements and edges representing potential pairs of the logic elements; determining a packing of pairs of the nodes to divide the graph into selected nodes and unselected nodes and selected edges and unselected edges by performing iterations of: identifying an augmenting path in the graph between a pair of unselected nodes; and modifying the selected nodes and unselected nodes and the selected edges and unselected edges based on the augmenting path; and grouping the logic elements in the description into pairs of logic elements based on the packing of pairs of the nodes.

20 Claims, 14 Drawing Sheets

STEP 0

STEP 1

STEP 2

STEP 3

710

○ NODE     ◎ SELECTED NODE
— EDGE     ▬ SELECTED EDGE

STEP 4

STEP 5

COMBINING LOGIC ELEMENTS INTO PAIRS IN A CIRCUIT DESIGN SYSTEM

FIELD OF THE INVENTION

Examples of the present disclosure generally relate to electronic circuit design and, in particular, to combining logic elements into pairs in a circuit design system.

BACKGROUND

Programmable integrated circuits (ICs) are often used to implement digital logic operations according to user configurable input. Example programmable ICs include complex programmable logic devices (CPLDs) and field programmable gate arrays (FPGAs). CPLDs often include several function blocks that are based on a programmable logic array (PLA) architecture with sum-of-products logic. A configurable interconnect matrix transmits signals between the function blocks.

One type of FPGA includes an array of programmable tiles. The programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth. Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

A conventional design process for programmable ICs begins with the creation of the design. The design is then compiled for implementation in a particular programmable IC device. During compilation, a circuit design can be "synthesized" to produce a representation of the circuit design in terms of specific logic elements, which can be optimized to the architecture of the programmable IC (e.g., lookup tables (LUTs), carry logic, 10 buffers, etc.). To generate an optimal implementation in terms of area in the programmable IC, the synthesis process can attempt to combine some logic elements together, including specific pairs of logic elements. Methods currently used to combine or "pack" pairs of logic elements during circuit design employ greedy algorithms. Greedy algorithms can be fast, but can also produce suboptimal results. Generally, greedy algorithms do not reconsider previous packing choices to improve the overall result. Suboptimal packing of logic element pairs results in suboptimal implementation area for the circuit design and suboptimal usage of resources in the programmable IC.

SUMMARY

Combining logic elements into pairs in a circuit design system is described. In an example implementation, a method of implementing a circuit design for an integrated circuit (IC), includes: on at least one programmed processor, performing operations including: processing a description of the circuit design having logic elements into a graph having nodes representing the logic elements and edges representing potential pairs of the logic elements; determining a packing of pairs of the nodes to divide the graph into selected and unselected nodes and selected and unselected edges by performing iterations of: identifying an augmenting path in the graph between a pair of unselected nodes; and modifying the selected and unselected nodes and the selected and unselected edges based on the augmenting path; and grouping the logic elements in the description into pairs of logic elements based on the packing of pairs of the nodes.

In another example implementation, a computer system including a circuit design tool executing therein configured to implement a circuit design for an integrated circuit (IC), wherein the circuit design tool is programmed to: process a description of the circuit design having logic elements into a graph having nodes representing the logic elements and edges representing potential pairs of the logic elements; determine a packing of pairs of the nodes to divide the graph into selected and unselected nodes and selected and unselected edges by performing iterations of: identifying an augmenting path in the graph between a pair of unselected nodes; and modifying the selected and unselected nodes and the selected and unselected edges based on the augmenting path; and group the logic elements in the description into pairs of logic elements based on the packing of pairs of the nodes.

In another example implementation, a non-transitory computer-readable storage medium comprising instructions, which when executed in a computer system, causes the computer system to carry out a method of implementing a circuit design for an integrated circuit (IC), comprising: processing a description of the circuit design having logic elements into a graph having nodes representing the logic elements and edges representing potential pairs of the logic elements; determining a packing of pairs of the nodes to divide the graph into selected and unselected nodes and selected and unselected edges by performing iterations of: identifying an augmenting path in the graph between a pair of unselected nodes; and modifying the selected and unselected nodes and the selected and unselected edges based on the augmenting path; and grouping the logic elements in the description into pairs of logic elements based on the packing of pairs of the nodes.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
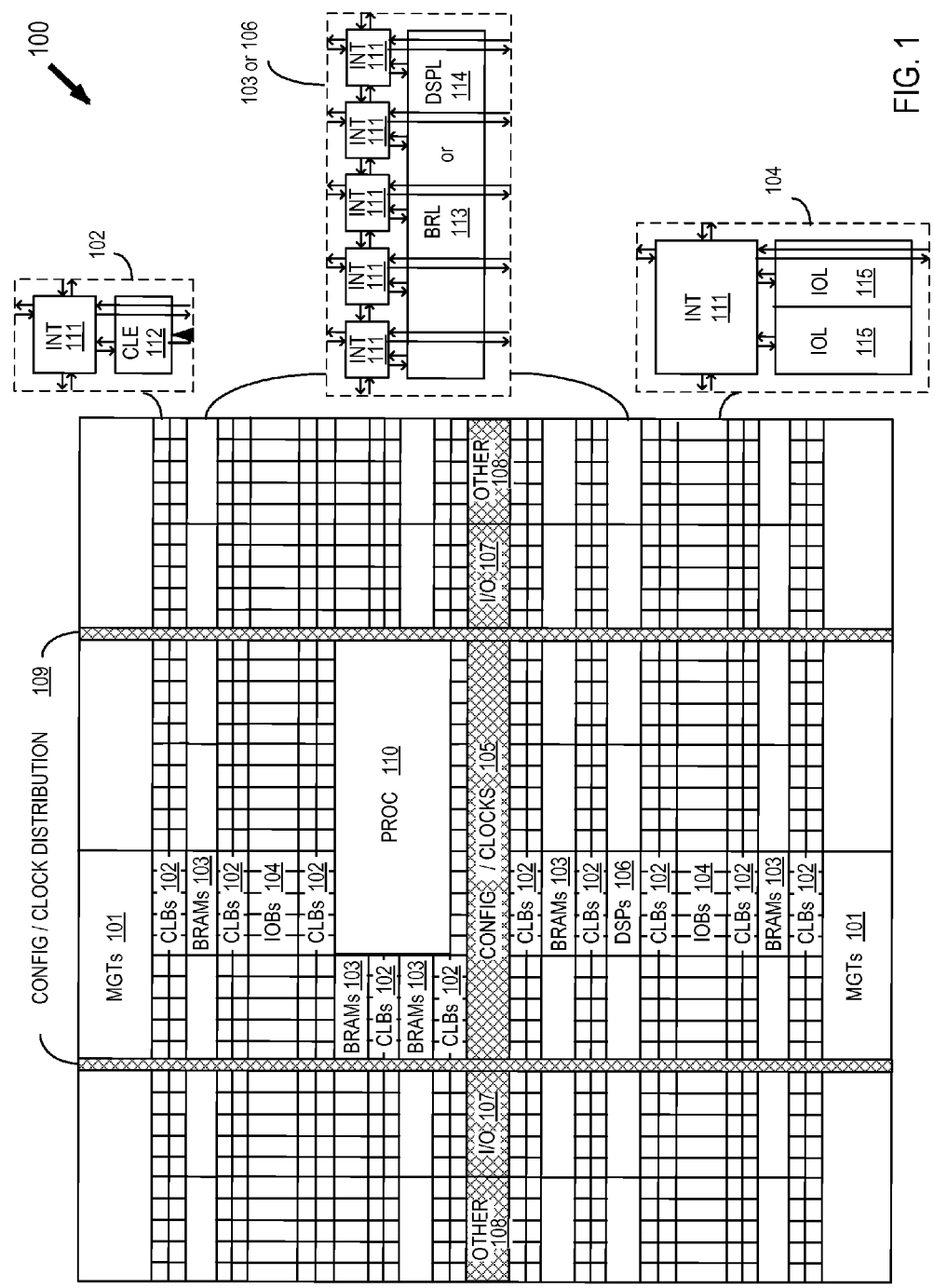
FIG. 1 illustrates an FPGA architecture according to an example implementation.

Combining logic elements into pairs in a circuit design system is described. An example implementation includes a method of implementing a circuit design for an integrated circuit (IC). The method includes a dual-element packing algorithm that finds an optimal combination of pairs of logic elements in a description of a circuit design, such as a logical description generated during synthesis of a circuit design for an IC. The method generates a graph having nodes representing the logic elements to be packed into pairs, and edges between nodes representing the potential logic element pairs. The method employs a matching algorithm to find an optimal packing of node pairs in the graph. The matching algorithm selects edges corresponding to node pairs until no more node pairs are possible. This logically divides the graph into selected nodes (i.e., nodes in pairs) and unselected nodes (i.e., nodes not in pairs), and selected edges (i.e., edges connecting selected node pairs) and unselected edges (i.e., edges not connecting selected node pairs). The matching algorithm can be performed in multiple iterations of identifying an "augmenting path" in the graph, and modifying the current packing of node pairs based on the augmenting path.

In general, an augmenting path in the graph begins and ends at unselected nodes having an alternating sequence of unselected and selected edges therebetween. In a given iteration, the current packing can be modified by changing each selected edge to an unselected edge, and each unselected edge to a selected edge, in the augmenting path. This results in a new, more optimal packing of node pairs than that produced in a previous iteration. The matching algorithm performs iterations on the graph to produce a packing of node pairs. After the packing is determined, the method groups the logic elements in the description into pairs of logic elements based on the packing of node pairs.

In one example implementation, the method processes the graph in two phases. In a first phase, an initial packing of node pairs is selected. For example, the initial packing can be obtained using a greedy algorithm. The greedy algorithm can be used to select edges corresponding to node pairs until no more node pairs are possible. The initial packing, however, is generally not an optimal solution. To further optimize the initial packing, the method proceeds to a second phase. In the second phase, the matching algorithm is performed using the initial packing to initialize the selected and unselected nodes and selected and unselected edges. The matching algorithm produces an optimal packing of node pairs for the graph.

In one example implementation, the edges in the graph are un-weighted and the objective is to maximize the number of node pairs in the graph. When no more augmenting paths can be identified, the packing includes the maximum number of node pairs and is optimal. In examples where an initial packing is determined, such as a greedy packing, the initial packing will be a suboptimal packing in terms of the number of node pairs. The optimal matching algorithm will add at leat one additional node pair to the initial packing.

In another example implementation, when the method forms the graph, weights are assigned to the edges representing potential logic element pairs. The objective is to maximize the total weight of packed logic element pairs. The method assigns values to the nodes in the graph. The values satisfy a "domination property" in that the sum of values of any node pair is greater than or equal to the weight of the edge connecting the node pair. For some node pairs, the sum of their values will be equal to the weight of the connecting edge and such node pairs will satisfy a "tightness property." Connecting edges between node pairs that satisfy the tightness property are referred to as "tight edges."

The method then performs an optimal matching algorithm having iterations of the following: (1) The method optionally adjusts some of the values assigned to the nodes to form at least one additional tight edge; (2) The method then identifies an augmenting path between two unselected nodes having an alternating sequence of unselected and selected tight edges (and potentially "fake edge(s)" that do not change the problem, as described below); and (3) The method modifies the current packing of node pairs based on the augmenting path (e.g., unselected and selected tight edges in the augmenting path are swapped to selected and unselected tight edges, respectively). This results in an optimal packing of node pairs in terms of weight. The optimal matching algorithm performs iterations on the graph to produce a packing of node pairs. After the packing is determined, the method groups the logic elements in the description into pairs of logic elements based on the packing of node pairs.

In the weighted graph example, the method performs two phases similar to the un-weighted example. That is, the method can determine the packing in two phases by first determining an initial packing based on tight edges (e.g., greedy packing) and then performing the matching algorithm described above using the initial packing as a starting point. The initial packing is used to produce an initial, faster, suboptimal result in terms of maximum weighting, and the matching algorithm is used to augment the initial packing to produce an optimal result in terms of maximum weighting.

The example dual-element packing methods described herein can be used during synthesis of circuit designs for ICs to pack pairs of logic elements for more efficient implementation. Example ICs include programmable ICs, such as field programmable gate arrays (FPGAs), complex programmable logic devices (CPLDs), and like types of programmable ICs having a set of programmable resources that can be configured to implement circuits. FPGAs, for example, include an array of configurable logic blocks (CLBs) that include lookup tables (LUTs) for implementing logic. A circuit design for an FPGA can be synthesized in terms of specific components, including LUTs. Some FPGA architectures allow two LUTs to be packed together into the same physical entity (a "dual LUT") when the LUTs share a specific number of inputs. In an example, LUTs can be generated during synthesis and then the dual-element packing methods described herein can be used to pack the LUTs into dual LUTs. The example methods can find the maximum number of duel LUTs that can be implemented, which provides an optimal implementation area. The dual-element packing methods can be employed to pack pairs of other types of logic elements for programmable ICs. The dual-element packing methods can be employed during circuit design for other types of ICs, including application specific integrated circuits (ASICs) and the like. These and further aspects are described further below.

Turning now to the figures, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured example, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
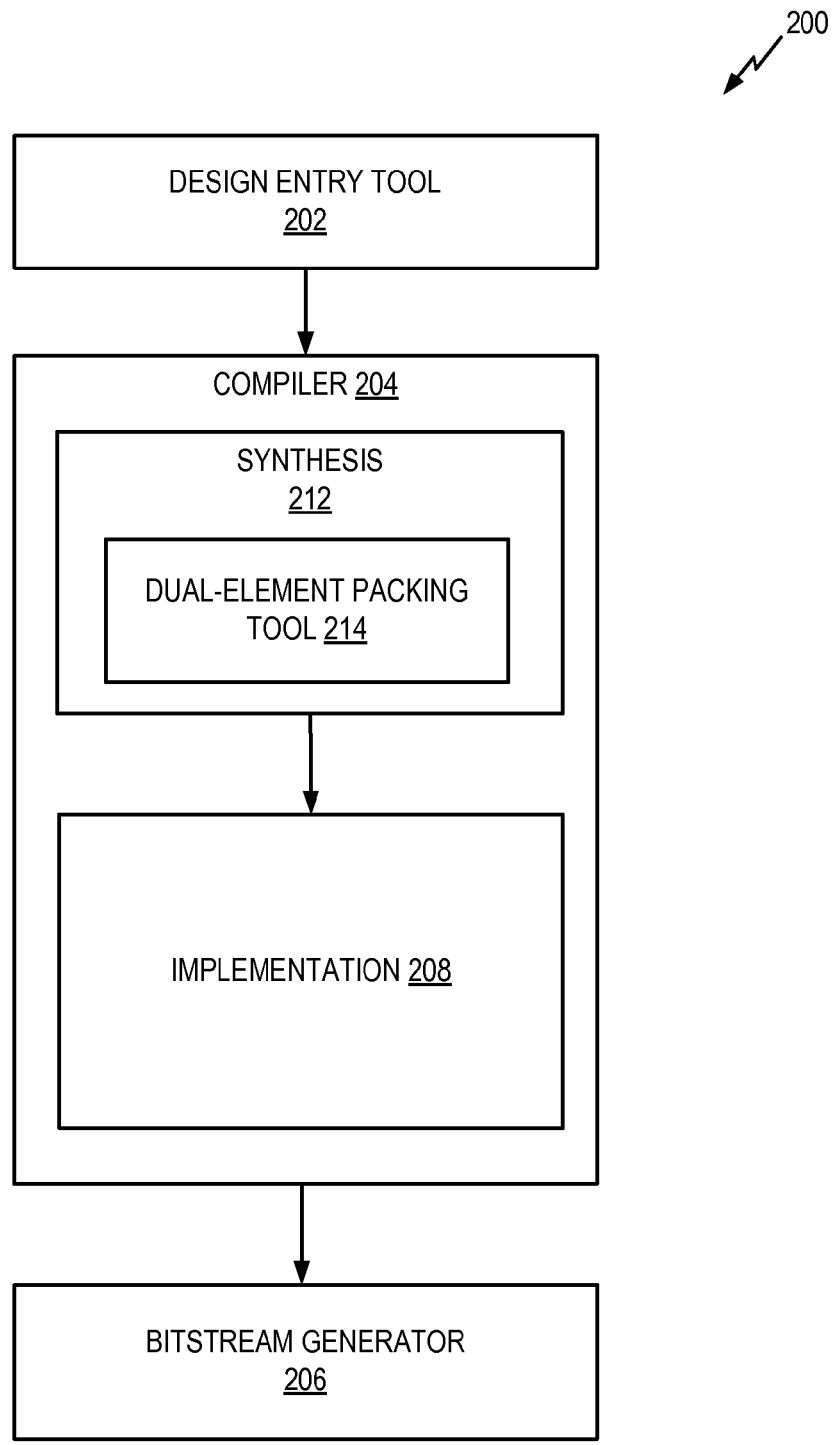
FIG. 2 is a block diagram depicting a circuit design system according to an example implementation.

FIG. 2 is a block diagram depicting a circuit design system 200 according to an example implementation. The circuit design system 200 includes at least one tool that handles different functions of the circuit design system 200. Each tool can be implemented by circuitry that is part of an electronic system, by firmware in the electronic system, by software in the electronic system, or by a combination thereof. While certain functions are described as being performed by specific tools, it is to be understood that the functions can be performed by other configurations of tool(s). An example electronic system in which the circuit design system 200 can be implemented is described below with respect to FIG. 12.

In general, the circuit design system 200 generates a description of the circuit design, which is processed into a physical implementation ("implementation") of the circuit design for a particular IC. The circuit design system 200 can process the description of the circuit design through various intermediate transformations to produce the implementation of the circuit design, including a functional description and a logical description. The implementation of the circuit design can be formatted and loaded into a programmable IC to produce a physical circuit, or used to produce physical masks to form an ASIC. Thus, the circuit design system 200 transforms an abstract representation of the circuit design (the description) into a physical representation of the circuit design (the implementation) that can be formatted to realize a physical circuit in an IC. By way of example, the circuit design system 200 is shown as generating a circuit design implementation for a programmable IC, such as an FPGA.

The circuit design system 200 includes a design entry tool 202, a compiler tool ("compiler 204"), and a bitstream generator tool ("bitstream generator 206"). The design entry tool 202 is configured to generate a functional description of the circuit design in response to user input. The functional description can include descriptions for a plurality of circuit components, such as flip-flops, memories, logic gates, processors, and the like, coupled together by connections (referred to as "nets" or "signals"). Example functional descriptions include a schematic description, a structural description, a behavioral description, or a combination thereof.

The design entry tool 202 may include a graphic user interface (GUI) through which a user connects symbols and blocks representing various components to produce a schematic description of the circuit design. In another example, the design entry tool 202 can also include a text interface through which a user writes hardware description language (HDL) code to produce a structural and/or behavioral description of the circuit design in terms of HDL constructs. The design entry tool 202 can employ a combination of schematic and HDL entry.

The compiler 204 is configured to process the functional description of the circuit design to produce a physical implementation of the circuit design. The compiler 204 can include a synthesis tool 212 and an implementation tool 208. The synthesis tool 212 can include dual-element packing tool 214.

The synthesis tool 212 is configured to produce a logical description of the circuit design from the functional description. The logical description of the circuit design includes a logical representation of the circuit design in terms of specific logic elements. For example, the logical description can include a register transfer level (RTL) description that represents the circuit design in terms of generic logic elements, such as adders, multipliers, counters, logic gates, and the like.

In another example, the logical description can include a representation of the circuit design in terms of specific logic elements optimized to the architecture of the programmable IC, such as lookup tables (LUTs), carry logic, 10 buffers, and like technology-specific components. In an example, the logical description includes a logical network list ("netlist") supported by the target programmable IC. One operation performed by the synthesis tool 212 is "technology mapping" that transforms generic circuit elements into technology-specific circuit elements.

The dual-element packing tool 214 is configured to combine logic elements into pairs in the circuit design according to example dual-element packing methods described herein. In general, the dual-element packing tool 214 finds an optimal combination of pairs of logic elements in the logical description of the circuit design. The dual-element packing tool 214 is configured to form a graph having nodes representing the logic elements and edges between nodes representing potential pairings of the logic elements. In some examples, the edges are un-weighted. Such a graph can model the case where there are no preferred pairings of logic elements. In other examples, the edges can be assigned weights. Such a graph with weighted edges can model the case where there are preferred pairings of the logic elements.

In one example, the dual-element packing tool 214 employs a matching algorithm to form an optimal packing of node pairs in the graph. The dual-element packing tool 214 then groups the logic elements according to the optimal node packing. In another example, the dual-element packing tool 214 operates on the graph in two phases. In a first phase, the dual-element packing tool 214 processes the graph to form an initial packing of node pairs (e.g., using a greedy algorithm). In a second phase, the dual-element packing tool 214 employs the matching algorithm to form a more optimal, second packing of node pairs. The dual-element packing tool 214 then groups the logic elements according to the second, optimal packing of the nodes in the graph. Using a greedy algorithm to find an initial packing does not improve the quality of the final packing, which is guaranteed to be optimal after complete of the matching algorithm. The greedy algorithm can be employed, however, to speed-up the matching algorithm by provide an initial set of packings.

In one example, dual-element packing tool 214 finds an optimal combination of pairs of lookup tables (LUTs) in the logical description of the circuit design. ICs, such as programmable ICs, can include LUTs for implementing combinatorial logic, shift registers, memories, or the like of the functional description. The dual-element packing tool 214 can combine LUTs in different ways. For example, pairs of LUTs can be implemented as dual LUTs. In another example, pairs of LUTs can be implemented as cascaded LUTs. Example LUT circuits for implementing pairs of LUTs are described below in FIGS. 3 and 4. While LUTs and LUT pairs are described by way of example, the dual-element packing tool 214 can combine other types of logic elements into pairs and use other implementations of such logic element pairs.

Figure 3:
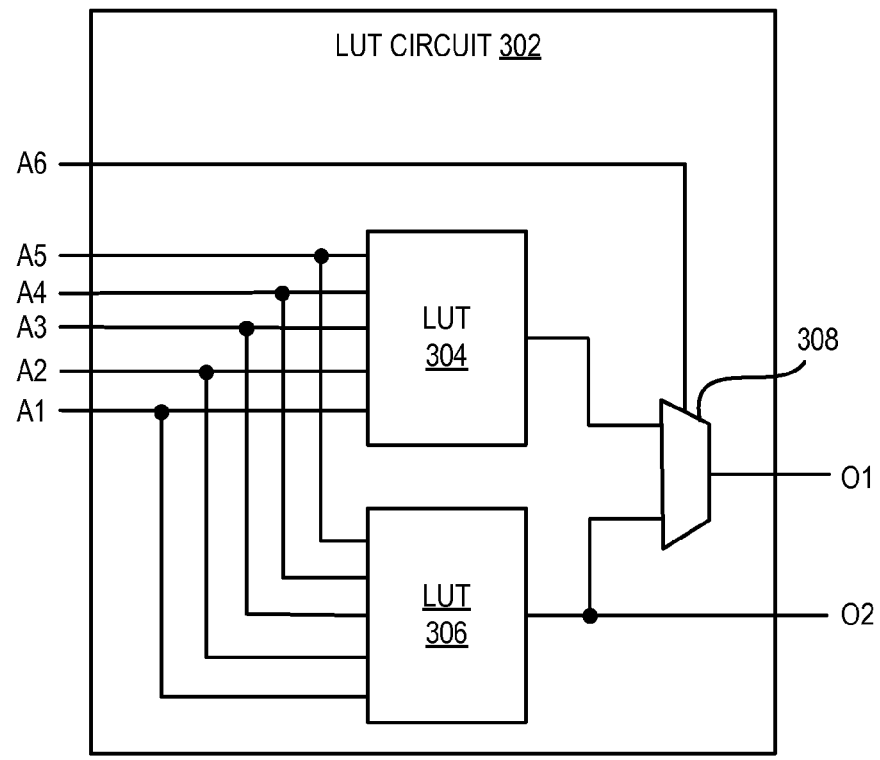
FIG. 3 is a block diagram depicting a LUT circuit according to an example implementation.

FIG. 3 is a block diagram depicting a LUT circuit 302 according to an example implementation. The LUT circuit 302 may be implemented in a programmable IC, such as within a CLB of an FPGA. The LUT circuit 302 includes six inputs designated A1 through A6, and two outputs designated O1 and O2. The LUT circuit 302 can be configured to implement a 6-input LUT. Alternatively, the LUT circuit 302 can be configured to implement two 5-input LUTs 304 and 306. The LUTs 304 and 306 share inputs A1 through A5. The input A6 is coupled to a multiplexer 308 that selectively couples output of either LUT 304 or LUT 306 to the output O1. Output of LUT 306 is coupled to the output O2. Thus, LUT circuit 302 can be configured as a dual-LUT that shares a plurality of inputs. While a specific number of inputs and outputs are shown in the example, the LUT circuit 302 can include any number of inputs and outputs.

Figure 4:
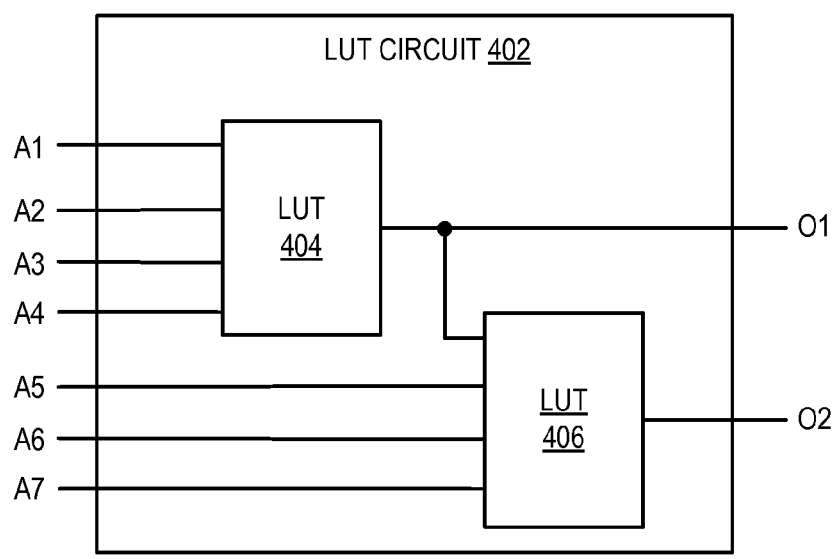
FIG. 4 is a block diagram depicting another LUT circuit according to an example implementation.

FIG. 4 is a block diagram depicting a LUT circuit 402 according to an example implementation. The LUT circuit 402 may be implemented in a programmable IC, such as within a CLB of an FPGA. The LUT circuit 402 includes seven inputs designated A1 through A7, and two outputs designated O1 and O2. The LUT circuit 402 further includes two cascaded LUTs 404 and 406. The LUT 404 receives inputs A1 through A4, and the LUT 406 receives the output of the LUT 404 and inputs A5 through A7. The output of LUT 404 drives the output O1, and the output of LUT 406 drives the output O2. While a specific number of inputs and outputs are shown in the example, the LUT circuit 402 can include any number of inputs and outputs.

Returning to FIG. 2, the implementation tool 208 is configured to produce a physical implementation of the circuit design from the logical description. The implementation of the circuit design is a physical representation of the circuit design for implementation in a target programmable IC (e.g., a circuit design implementation). The bitstream generator 206 is configured to format the physical implementation into a format for programming the programmable IC. For example, the bitstream generator 206 can generate a configuration bitstream from the physical implementation for configuring an FPGA. In general, the bitstream generator 206 can format the physical implementation into other types of data formats required to program a physical circuit in the programmable IC.

Figure 5:
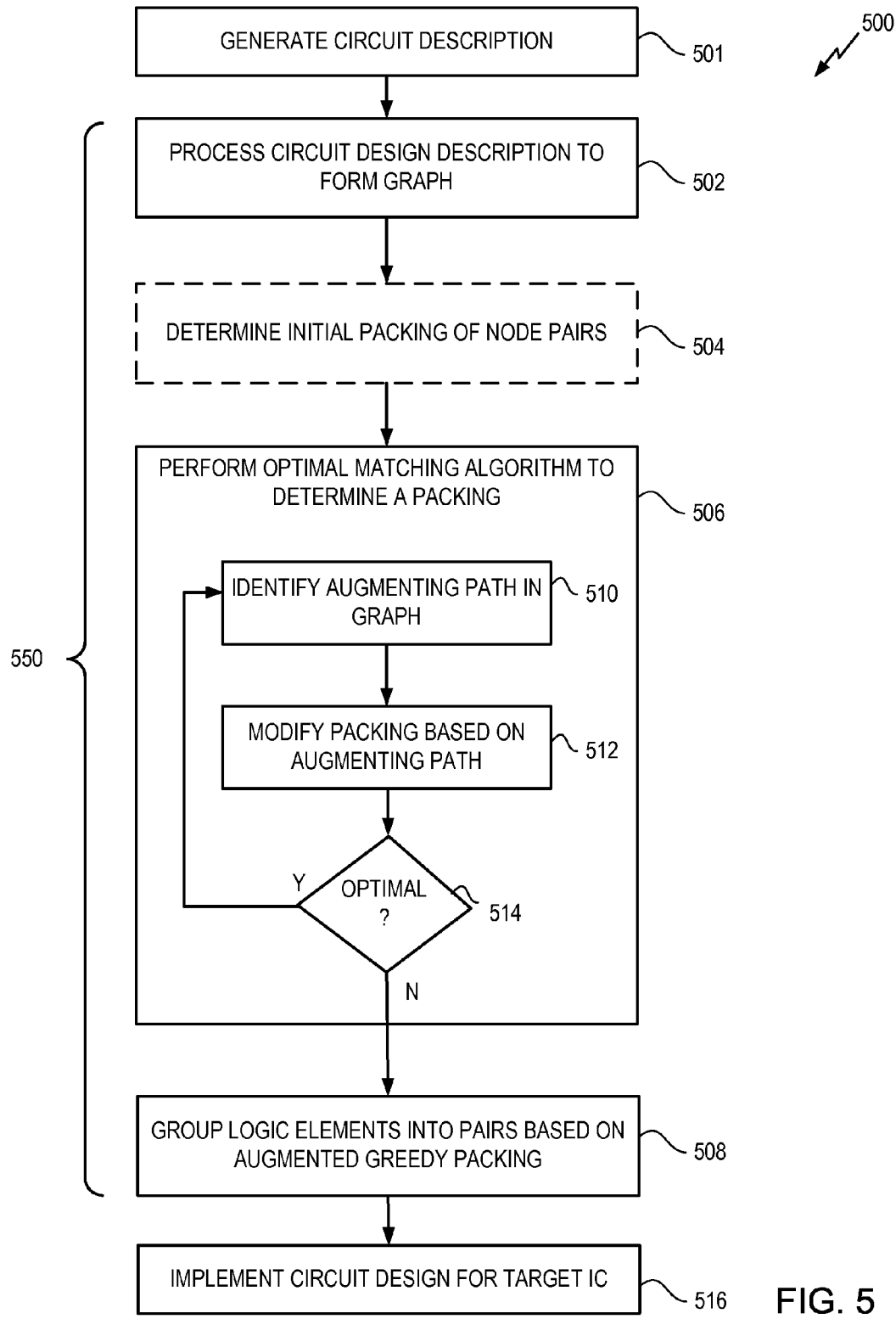
FIG. 5 is a flow diagram depicting a method of implementing a circuit design for an IC according to an example implementation.

FIG. 5 is a flow diagram depicting a method 500 of implementing a circuit design for an IC according to an example implementation. The circuit design system 200 may perform the method 500. The method 500 begins at step 501, where a description of the circuit design is generated. For example, the design entry tool 202 can generate a functional description, and the synthesis tool can transform the functional description into a logical description. The method 500 then proceeds to perform steps of a method 550 of combining logic elements into pairs.

The method 550 begins at step 502, the circuit design description is processed to form a graph. Nodes in the graph represent logic elements, and edges in the graph represent potential pairs of the logic elements. At optional step 504, an initial packing of the node pairs can be determined (e.g., a "first packing" is determined). For example, the dual-element packing tool 214 can iteratively select one pair of nodes at each step and pack them into pairs until no more packing is possible (e.g., using a greedy algorithm). With the initial packing (e.g., greedy packing), the dual-element packing tool 214 does not reconsider selections of node pairs in previous iterations. Thus, the initial packing may not be an optimal packing.

At step 506, an optimal matching algorithm is performed to determine a packing of node pairs in the graph. In general, at step 510, an augmenting path is identified in the graph. An "augmenting path" in the graph begins and ends at unselected nodes (i.e., nodes not grouped into pairs). In a general, the augmenting path includes an alternating sequence of unselected and selected edges (i.e., selected edges are those connecting selected node pairs, and unselected edges are those not connecting selected node pairs). At step 512, the current packing is modified based on the augmenting path. The modification results in a more optimal packing than the current packing. For example, in a graph with un-weighted edges, a more optimal packing includes at least one more node pair than a previous packing. In a graph with weighted edges, a more optimal packing includes a more optimal packing in terms of weight than a previous packing.

At step 514, a determination is made whether the current packing is optimal. If not, the method 500 returns to step 510 and repeats for another iteration. If so, the method 500 exits step 506 and proceeds to step 508. Various criteria can be used to determine if the current packing is optimal. For example, for a graph with un-weighted edges, a determination can be made whether there are more augmenting paths that can be identified. If not, the packing is optimal. For a graph with weighted edges, a determination can be made whether the weight of the current packing is optimal (discussed below). At step 508, logic elements in the description are grouped into pairs based on the packing produced in step 506.

The method 550 then proceeds to step 516. At step 516, the description of the circuit design is processed to implement the circuit design for a target IC. For example, the description can be processed by implementation tool 208 and bitstream generator 206 to produce a physical implementation formatted for a programmable IC, such as an FPGA.

Figure 6:
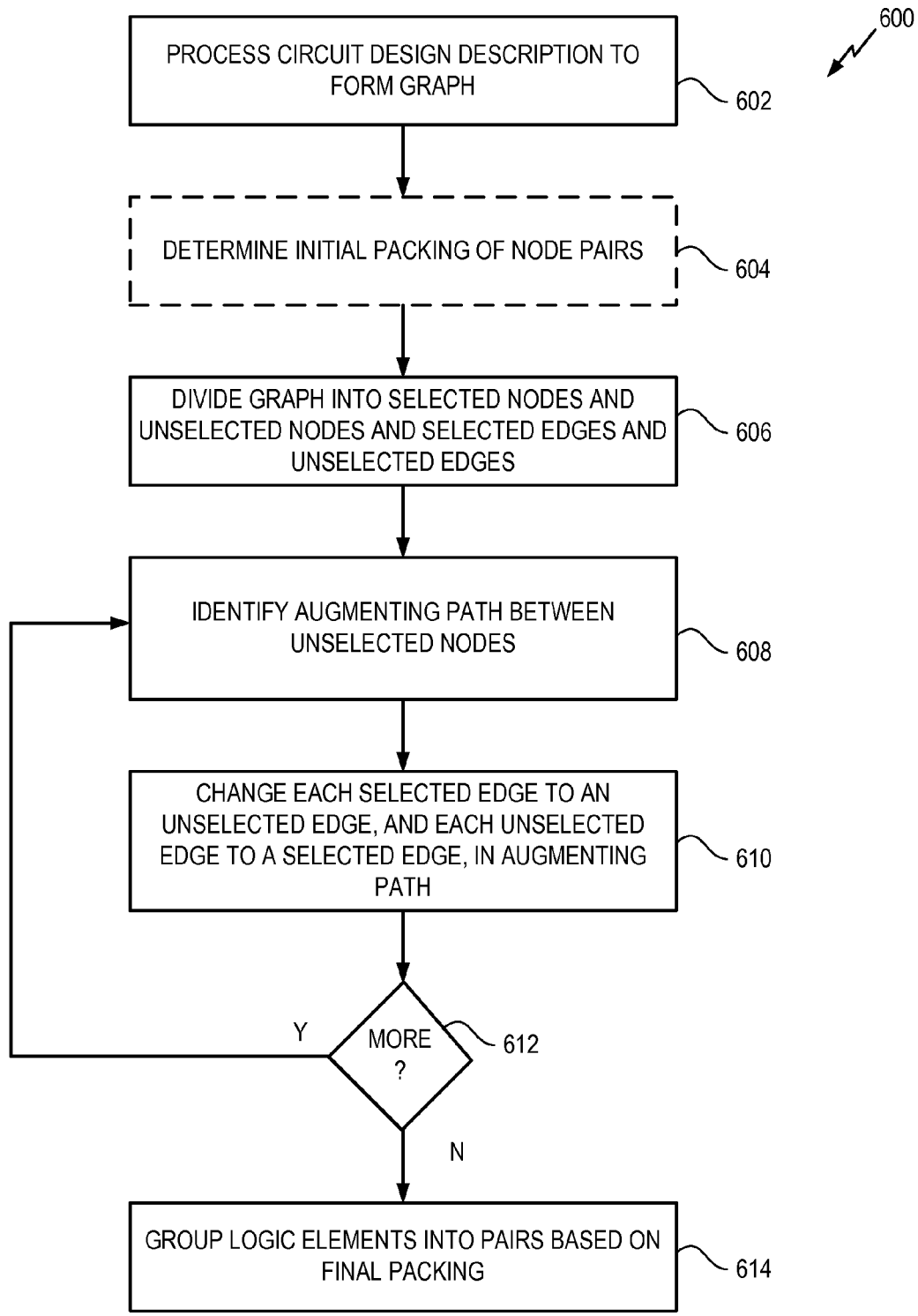
FIG. 6 is a flow diagram depicting a method of combining logic elements into pairs in a circuit design system according to an example implementation.

FIG. 6 is a flow diagram depicting a method 600 of combining logic element pairs in a circuit design system according to an example implementation. The method 600 is an example implementation of the more general method 550 of FIG. 5 where edges are un-weighted. The method 600 may be performed by the dual-element packing tool 214 of FIG. 2. The method 600 begins at step 602, where a circuit design description is processed to form a graph. In the method 600, no weights are assigned to the edges. At optional step 604, an initial packing of node pairs is determined (e.g., greedy packing). At step 606, the graph is divided into selected nodes and unselected nodes, and selected edges and unselected edges. If no initial packing was determined, all nodes and edges are unselected and the sets of selected nodes and edges are empty. If an initial packing was determined at step 604, the division is logically formed as a result of the initial packing of node pairs (e.g., some node pairs are selected and others unselected, resulting in some edges being selected and some edges being unselected).

At step 608, an augmenting path is identified between unselected nodes. Generally, the augmenting path has an alternating sequence of unselected and selected edges between the unselected nodes. In a trivial case, however, the set of selected edges is empty and the augmenting path can have a single unselected edge between the unselected nodes. At step 610, each selected edge is changed to an unselected edge, and each unselected edge is changed to a selected edge, in the augmenting path. Thus, the graph is modified to include an additional node pair. At step 612, a determination is made whether another augmenting path can be identified. If so, the method 600 returns to step 608 and repeats for another iteration. If the graph includes no more augmenting paths, the current packing is optimal. If the graph includes no more augmenting paths, the method 600 proceeds to step 614, where logic elements are grouped into pairs based on the final packing.

Figure 7A:
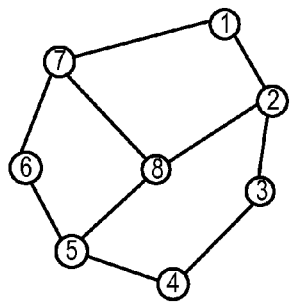
FIGS. 7A and 7B depict a transformation of an example graph during the method of FIG. 6 according to an example implementation.
Figure 7A:
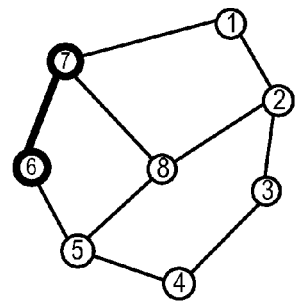
Figure 7A:
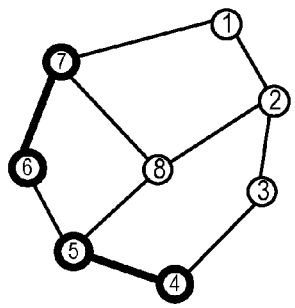
Figure 7A:
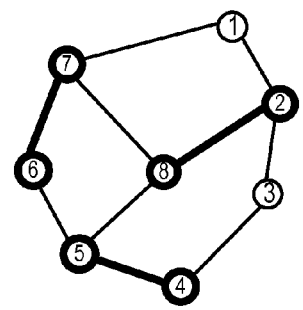
Figure 7A:
Figure 7B:
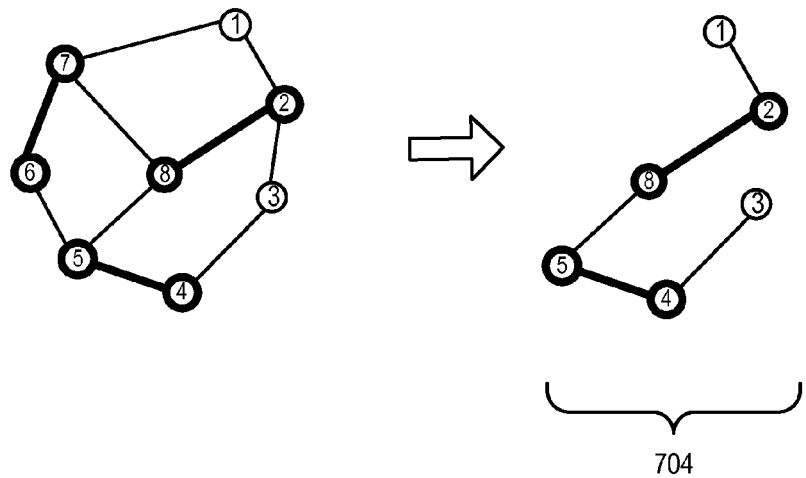
Figure 7B:
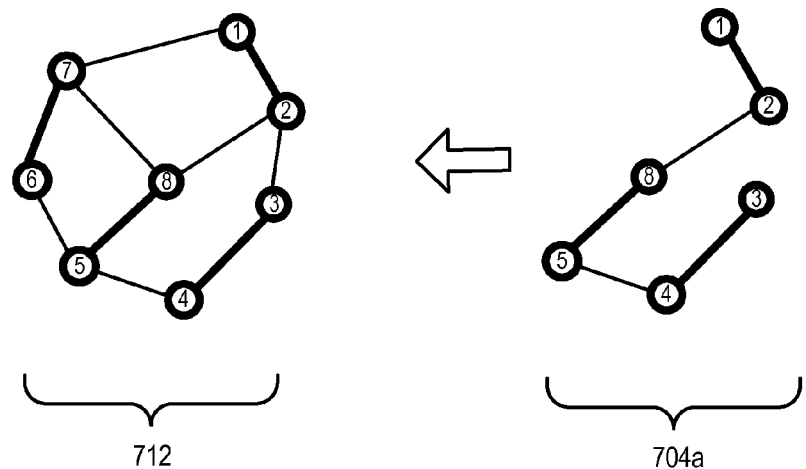

FIGS. 7A and 7B depict a transformation of an example graph during the method 600 according to an example implementation. Referring first to FIG. 7A, at an initial step ("step 0"), the graph includes eight nodes designated 1 through 8 and represented by circles. The nodes represent logic elements to be packed into pairs. The graph also includes 10 edges represented by lines connecting the nodes. The edges represent potential pairings of the logic elements. In the example graph, edges exist between nodes 1 and 2; nodes 2 and 3; nodes 3 and 4; nodes 4 and 5; nodes 5 and 6; nodes 6 and 7; nodes 7 and 1; nodes 7 and 8; nodes 5 and 8; and nodes 8 and 2. The graph at step 0 can be formed at step 602 of the method 600. The edges in the graph are un-weighted.

At a next step ("step 1"), a first pair of nodes is selected (e.g., nodes 6 and 7). Selected nodes and edges are represented in FIGS. 7A and 7B by bold circles and bold lines, respectively. At a next step ("step 2"), another pair of nodes is selected (e.g., nodes 4 and 5). At a next step ("step 3"), yet another pair of nodes is selected (e.g., nodes 8 and 2). Steps 1 through 3 are three iterations of a greedy packing algorithm that produces a greedy packing 710 as an initial packing. The greedy packing 710 is not optimal, as two nodes (e.g., nodes 1 and 3) remain unpaired. The greedy packing 710 can be determined at optional step 604 of the method 600.

Turning to FIG. 7B, at a next step ("step 4"), an augmenting path 704 is identified. The augmenting path 704 is a path between unselected nodes 1 and 3. The path includes an unselected edge between nodes 1 and 2, a selected edge between nodes 2 and 8, an unselected edge between nodes 8 and 5, a selected edge between nodes 5 and 4, and an unselected edge between nodes 4 and 3. Thus, the augmenting path 704 includes an alternating sequence of unselected and selected edges between unselected nodes 1 and 3. The augmenting path 704 can be identified at step 608 of the method 600.

At a next step ("step 5"), the augmenting path 704 is modified to improve the number of selected node pairs by one and form an augmenting path 704a. The modification includes changing each selected edge to an unselected edge, and each unselected edge to a selected edge, in the augmenting path 704. Thus, the augmenting path 704a includes a selected edge between nodes 1 and 2, an unselected edge between nodes 2 and 8, a selected edge between nodes 8 and 5, an unselected edge between nodes 5 and 4, and a selected edge between nodes 4 and 3. Thus, after steps 4 and 5, the greedy packing 710 is modified to form an augmented packing 712 having one additional pair of nodes (in terms of the number of node pairs). That is, in the augmented packing 712, nodes 1 and 3 are selected as part of node pairs (e.g., node pair 1 and 2, and node pair 3 and 4). The modification of the greedy packing 710 can include the breaking of previously defined node pair(s) in order to form one additional node pair. In the example, the node pair 2 and 8 is unselected to form node pair 1 and 2 and node pair 3 and 4. The modification of the packing can be performed at step 610 in the method 600. In the present example, only one augmenting path can be identified and an optimal packing is achieved after one augmenting iteration. Other more complicated graphs can require more than one augmenting iteration to achieve optimal packing. Further, in other examples as discussed above, an initial packing is not formed and the matching algorithm is performed on the graph without starting from an initial packing.

Figure 8:
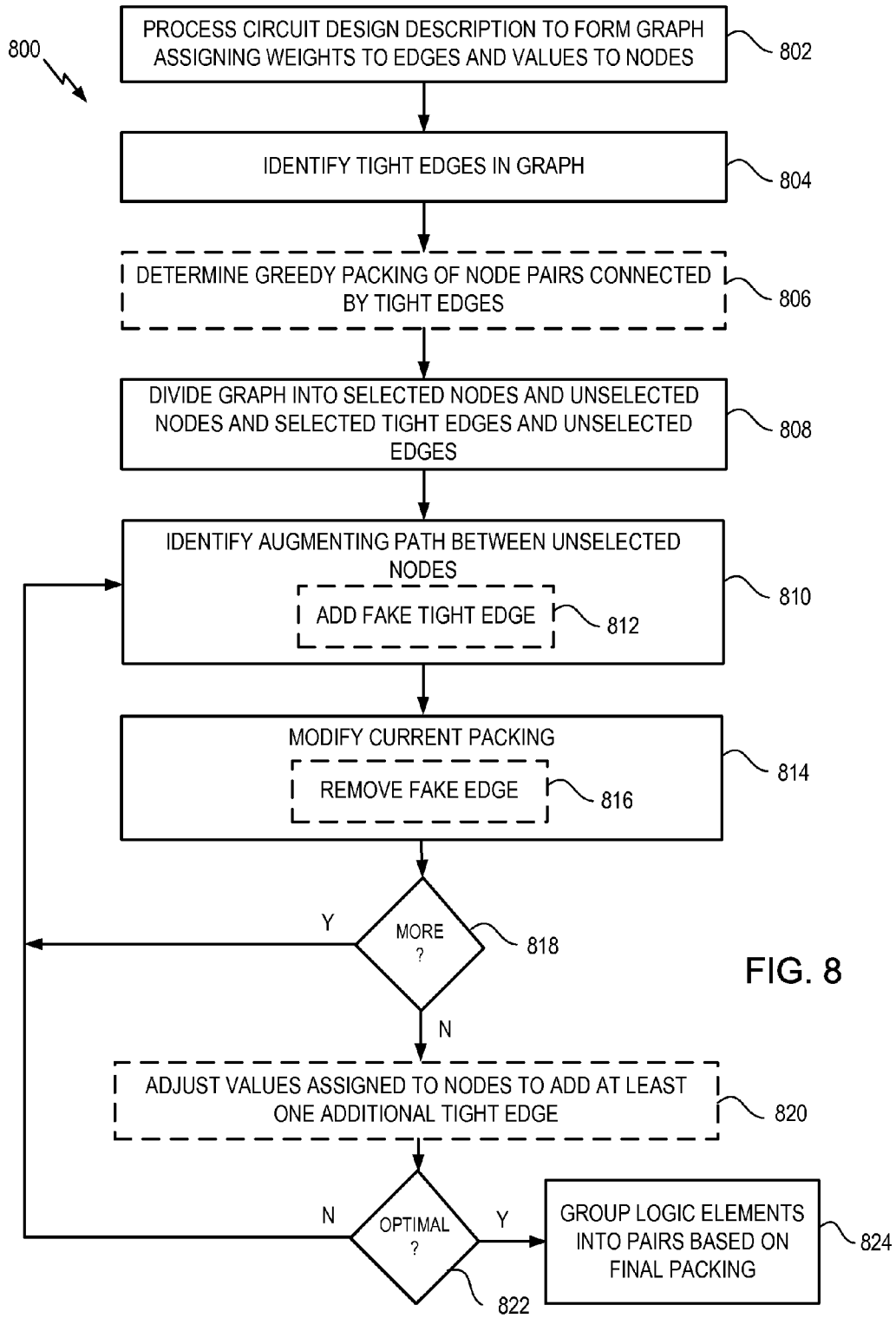
FIG. 8 is a flow diagram depicting a method of combining logic elements into pairs in a circuit design system according to another example implementation.

FIG. 8 is a flow diagram depicting a method 800 of combining logic elements into pairs in a circuit design system according to another example implementation. The method 800 is an example implementation of the more general method 550 of FIG. 5, where the edges are weighted. The method 800 may be performed by the dual-element packing tool 214 of FIG. 2. The method 800 begins at step 802, where a circuit design is processed to form a graph having weights assigned to edges and values assigned to nodes.

In the method 800, the objective is to maximize the total weight of all logic element pairs (not necessarily the number of logic element pairs). It can be useful to put weights on edges in order to favor some packing of the logic elements. For example, two LUTs that share five inputs are a more efficient packed pair than two LUTs that share only a single input (e.g., each shared input saves one connection from having to be routed during implementation). In order to solve the maximum weighted dual-packing problem, values are assigned to each node in the graph. The values assigned to nodes satisfy a "domination property" if the sum of values of a potential node pair in the graph is greater than or equal to the weight of the edge connecting the potential node pair. That is, for each node pair (u, v) such that there is an edge, e, between u and v with weight, w:

$$y(u)+y(v) \geq w(e) \qquad \text{Eq.1,}$$

where y(u) is the value assigned to node u, and y(v) is the value assigned to node v. The values assigned to nodes satisfy a "tightness property" if the sum of the values of a potential node pair in the graph is equal to the weight of the edge connecting the potential node pair. That is, a node pair (u, v) satisfy the tightness property if:

$$y(u)+y(v)=w(e) \qquad \text{Eq.2.}$$

The sum of all values assigned to nodes in the graph is always greater than or equal to the weight of any packing. That is, for any packing M, the following is true:

$$\sum_{e \in M} w(e) \leq \sum_{u \in G} y(u), \qquad \text{Eq. 3}$$

where the set G includes all nodes in the graph, and the set M includes all edges selected for a given packing. Equation 3 is a consequence of the domination property used to assign the values to the nodes. Thus, if the total weight of a particular packing is equal to the sum of the values assigned to the nodes, then the packing is guaranteed to be optimal.

Accordingly, at step 802, the values are assigned to the nodes to satisfy the domination property. At step 804, tight edges in the graph are identified. At optional step 806, an initial packing of node pairs connected by tight edges is determined (e.g., greedy packing). At step 808, the graph is divided into selected nodes and unselected nodes, and selected edges and unselected edges. If an initial packing is not performed, all of the nodes and edges are unselected and the sets of selected nodes and edges are empty. If an initial packing was performed on the tight edges, the selected edges include tight edges and the division is logically formed as a result of the initial packing of node pairs connected by tight edges (e.g., some node pairs are selected and others unselected, resulting in some tight edges being selected and other edges being unselected).

At step 810, an augmenting path is identified between unselected nodes. Generally, the augmenting path has an alternating sequence of unselected and selected tight edges between unselected nodes. In a trivial case, however, the set of selected tight edges is empty and the augmenting path can have a single unselected tight edge between unselected nodes.

In some examples, the augmenting path can include a "fake edge" in the sequence that is deemed to be an unselected edge. A "fake edge" is a connection between nodes in the graph that does not alter the original problem, i.e., an edge having a weight of zero. A fake edge can always be added between two nodes in the graph not having an edge without changing the problem because adding such fake edges into the set of selected edges does not change the total weight of the packing. Fake edges, however, can only be added if they are tight, which implies that the node values of two nodes connected by a fake edge are zero. A fake tight edge can be added at optional step 812.

At step 814, each selected tight edge is changed to an unselected tight edge, and each unselected tight edge is changed to a selected tight edge, in the augmenting path. In some examples, if the augmenting path includes a fake edge, the fake edge can be removed at step 816. Thus, the graph is modified to include a more optimal packing in terms of weight. That is, after the modification at step 814, the packing is increased by one node pair (including a fake edge if present) and the total weight of the packing is increased by a positive number.

Figure 10:
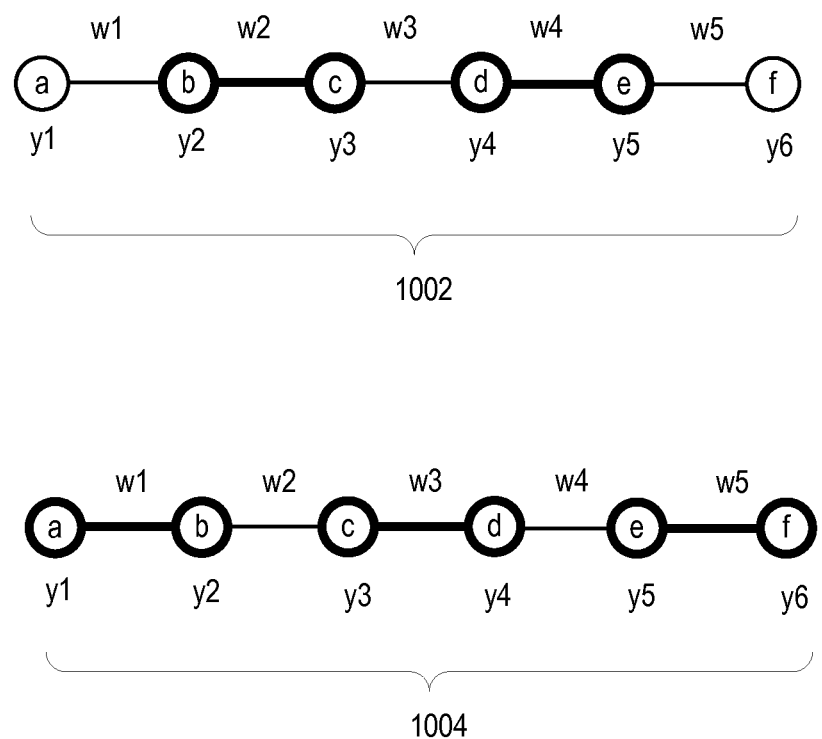
FIG. 10 illustrates an example transformation of an augmenting path.

FIG. 10 illustrates an example transformation of an augmenting path. An augmenting path 1002 includes nodes a through f represented by circles, and tight edges represented by lines with weights w1 through w5. The nodes a through f are assigned values y1 through y6, respectively, such that the edges are tight. The augmenting path 1002 includes a path between two unselected nodes a and f with an alternating sequence of unselected and selected tight edges. The total weight of the augmenting path 1002 is w2+w4, which is equal to y2+y3+y4+y5 due to the tightness property. A modified augmenting path 1004 is produced after swapping of selected and unselected tight edges. The modified augmenting path 1004 has a total weight of w1+w3+w5, which is equal to y1+y2+y3+y4+y5+y6. Thus, the operation of swapping selected and unselected tight edges has increased the node pairs by one and the packing weight by y1+y6, which is always positive or null due to the fact that node values are always positive or null.

Returning to FIG. 8, at step 818, a determination is made whether the graph includes another augmenting path. If so, the method 800 returns to step 810 and repeats for another iteration. Otherwise, the method 800 proceeds to optional step 820. At optional step 820, node values are adjusted to add at least one additional tight edge to the graph. In some cases, however, no more tight edges can be added to the graph and thus step 820 is omitted. At step 822, a determination is made whether the current packing is optimal. If not, the method 800 returns to step 810 and repeats for another iteration. If so, the method 800 proceeds to step 824. If no more augmenting paths can be formed, and no more tight edges can be added to the graph by adjusting node values, the packing is optimal. Alternatively, if the weight of the current packing is equal to the sum of all node values, the current packing is optimal. At step 824, the logic elements are grouped into pairs based on the final packing that is an optimal weighted packing.

Figure 9A:
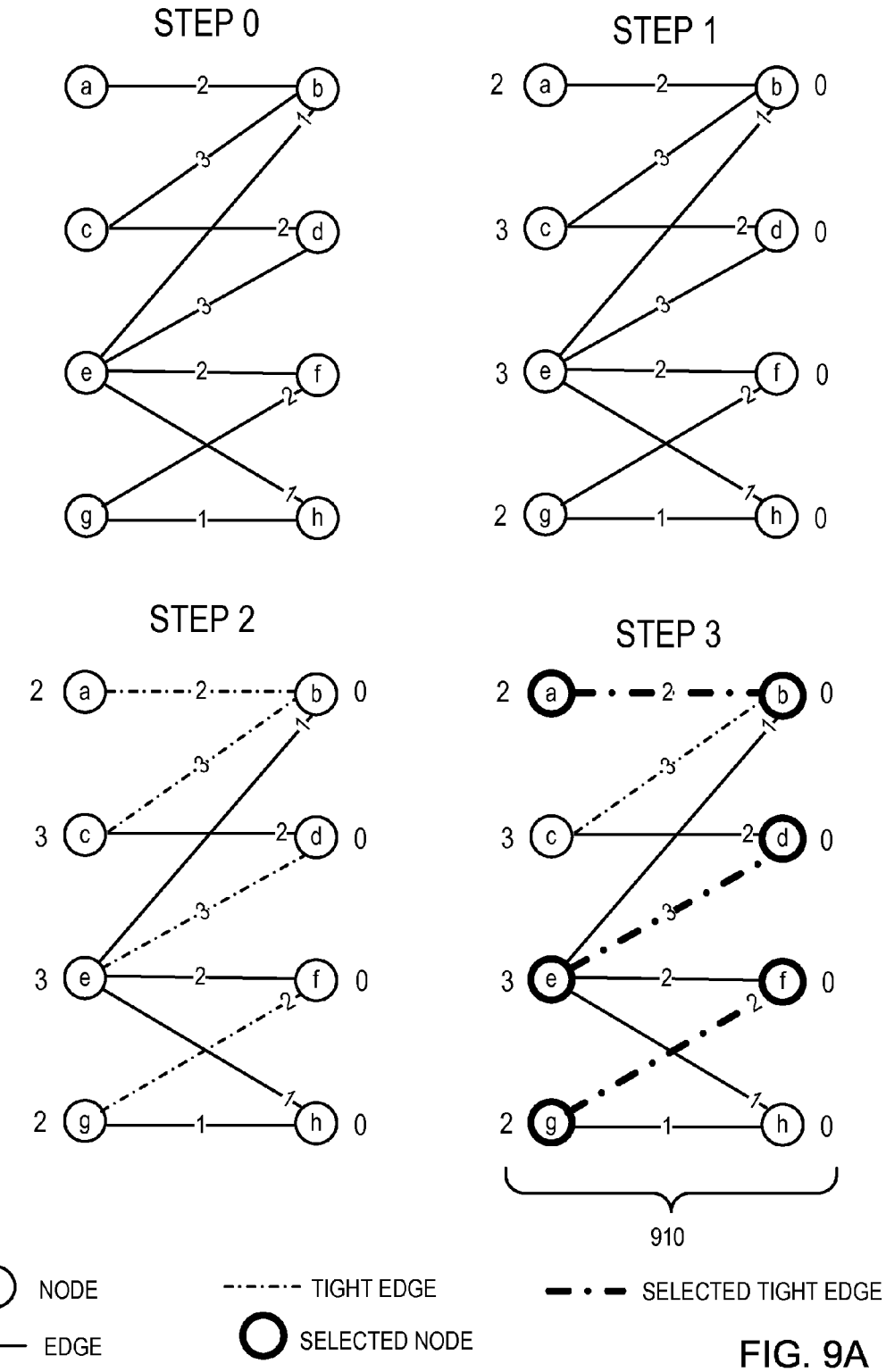
FIGS. 9A, 9B and 9C depict a transformation of an example graph during the method of FIG. 8 according to an example implementation.
Figure 9B:
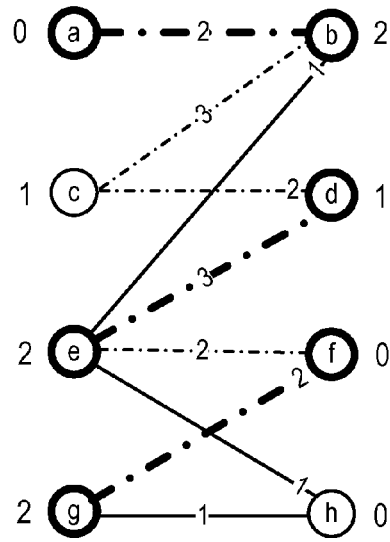
Figure 9B:
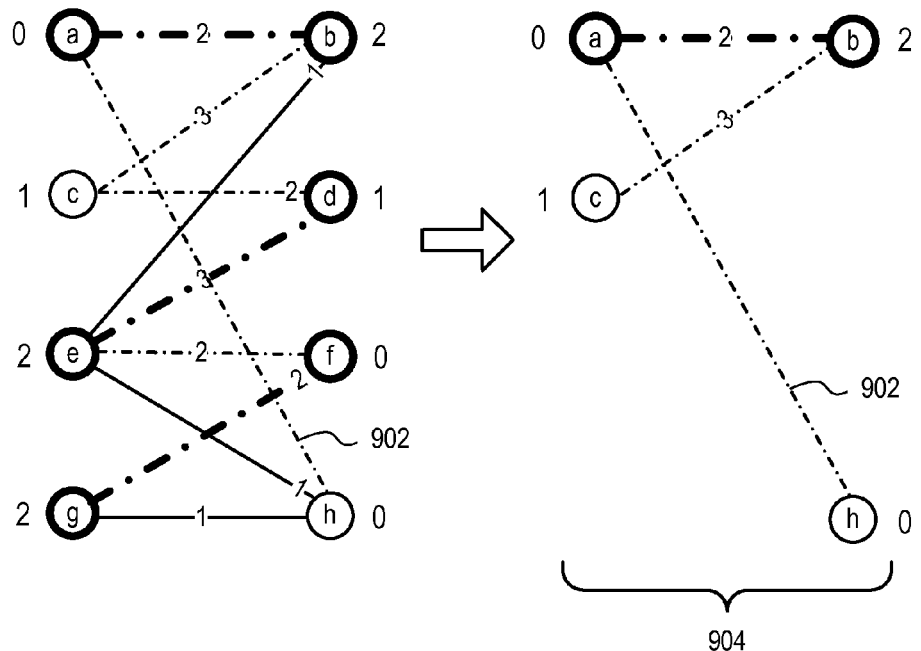
Figure 9C:
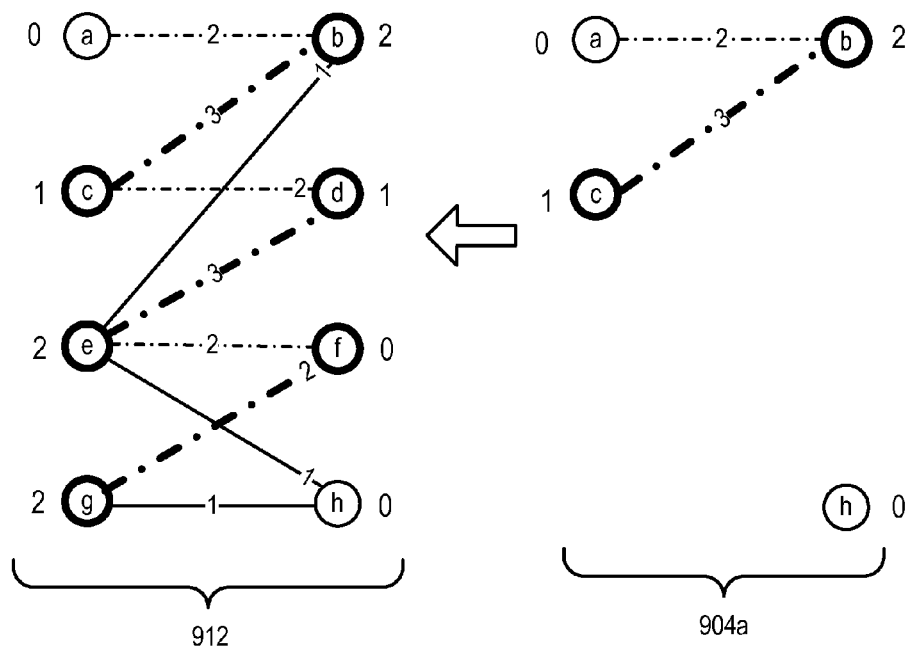

FIGS. 9A, 9B and 9C depict a transformation of an example graph during the method 800 according to an example implementation. Referring first to FIG. 9A, at an initial step ("step 0"), the graph includes eight nodes designated a through h and represented by circles. The nodes represent logic elements to be packed into pairs. The graph also includes nine edges represented by lines connecting the nodes. The edges represent potential pairings of the logic elements. In addition, each of the edges includes an assigned weight. The assigned weight represents a preference of the potential pairing. In the example, the graph includes an edge between nodes a and b having a weight of 2; an edge between nodes c and d having a weight of 2; an edge between nodes c and b having a weight of 3; an edge between nodes e and f having a weight of 2; an edge between nodes e and d having a weight of 3; an edge between nodes e and b having a weight of 1; an edge between nodes g and h having a weight of 1; an edge between nodes g and f having a weight of 2; and an edge between nodes e and h having a weight of 1. The graph can be formed at step 802 of the method 800.

At a next step ("step 1"), values are assigned to the nodes satisfying the domination property. In the present example, node a is assigned a value of 2; node c is assigned a value of 3; node e is assigned a value of 3; node g is assigned a value of 2; and nodes b, d, f, and h are each assigned a value of 0. Values can be assigned to the graph at step 802 of the method 800.

At a next step ("step 2"), tight edges are identified. Tight edges are represented by dash-dot lines in the graph. In the example, the graph includes tight edges between nodes a and b, nodes c and b, nodes e and d, and nodes g and f. Tight edges can be identified at step 804 of the method 800.

At a next step ("step 3"), node pairs having tight edges are selected iteratively according to a greedy algorithm to produce a greedy packing of tight edges ("greedy packing 910"). Selected nodes and tight edges are represented in FIGS. 9A, 9B and 9C by bold circles and bold dash-dot lines, respectively. The greedy packing can be formed at optional step 806 of the method 800.

Turning to FIG. 9B, at a next step ("step 4"), the values assigned to the nodes are adjusted to add at least one additional tight edge to the graph. In the example, the value of node a is adjusted from 2 to 0; the value of node b is adjusted from 0 to 2; the value of node c is adjusted from 3 to 1; the value of node d is adjusted from 0 to 1; the value of node e is adjusted from 3 to 2; the value of node f remains at 0; the value of node g remains at 2; and the value of node h remains at 0. Additional tight edges are added to the graph between nodes c and d and between nodes e and f. After step 4, the total weight of the packing is 7, while the sum of all node values is 8. This indicates that the packing is not yet optimal. The additional tight edges can be formed at step 820 of the method 800.

At a next step ("step 5"), an augmenting path 904 is identified. The augmenting path 904 is a path between unselected nodes h and c. The augmenting path 904 includes an unselected tight edge between c and b, a selected tight edge between nodes b and a, an unselected tight edge 902 between a and h. The unselected tight edge 902 is a fake edge having a weight of 0. The augmenting path 904 can be identified at step 810 of the method 800.

Turning to FIG. 9C, at a next step ("step 6"), the augmenting path 904 is modified to form an augmenting path 904*a*. The modification includes changing each selected tight edge to an unselected tight edge, and each unselected tight edge to a selected tight edge, in the augmenting path 904. Thus, the augmenting path 904*a* includes a selected tight edge between nodes c and b, and an unselected tight edge between nodes b and a. The fake edge 902 can be removed. Thus, after steps 4, 5 and 6, the packing 910 is modified to form an augmented packing 912 having a more optimal packing in terms of weight. That is, in the augmented packing 912, nodes c and b are paired with an edge of weight 3, replacing the pair of nodes a and b with an edge of weight 2. The augmented packing 912 has a total weight of 8, which equals the sum of selected node values. Thus, the augmented packing 912 is optimal.

The modification of the packing can be performed at step 814 of the method 800. In the present example, only one augmenting path is identified and optimal packing is achieved after one augmenting iteration. Other more complicated graphs can require more than one augmenting iteration to achieve optimal packing.

Figure 11:
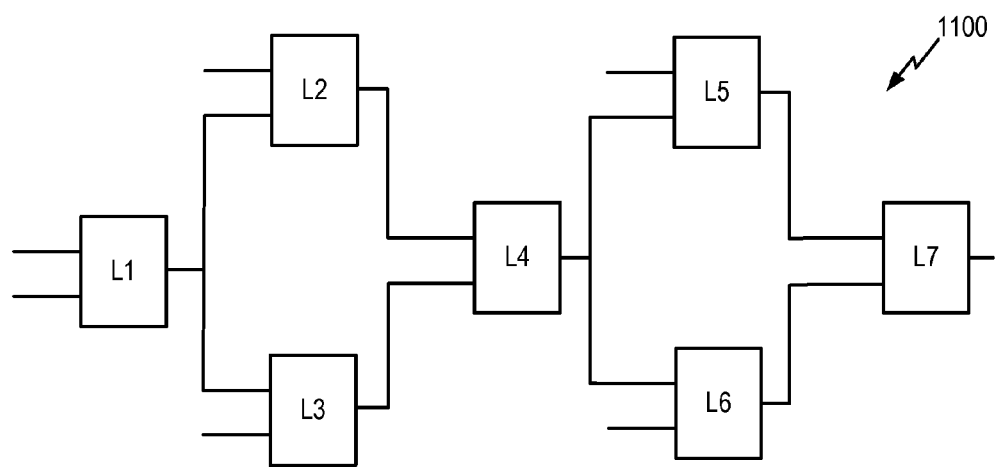
FIG. 11 is a block diagram depicting an example circuit of LUTs in a description of a circuit design according to an example implementation.

FIG. 11 is a block diagram depicting an example circuit 1100 of LUTs in a description of a circuit design according to an example implementation. The circuit 1100 can be generated as part of a logical description of a circuit design. The circuit 1100 includes a cascaded configuration of LUTs L1 through L7. Each LUT L1 through L7 includes two inputs and a single output. The output of LUT L1 drives first inputs of LUTs L2 and L3, respectively. Outputs of LUTs L2 and L3 drive first and second inputs of LUT L4, respectively. An output of LUT L4 drives first inputs of LUTs L5 and L6, respectively. Outputs of LUTs L5 and L6 drive first and second inputs of LUT L7, respectively. First and second inputs of LUT L1, second inputs of LUTs L2, L3, L5, and L6, and an output of LUT L7 can be connected to other circuitry (not shown).

If a target programmable IC had CLBs with LUT circuits capable of being configured to implement dual-cascaded LUTs, the circuit 1000 can be optimized for the dual-cascaded LUT configuration. In particular, pairs of the LUTs L1 through L7 can be selected, with each pair being implemented in a dual-cascaded LUT of the programmable IC.

Figure 12:
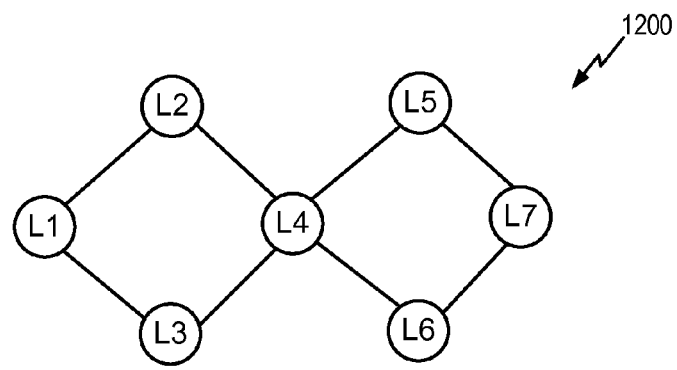
FIG. 12 is a block diagram depicting a graph representative of the circuit of FIG. 10 according to an example implementation.

FIG. 12 is a block diagram depicting a graph 1200 representative of the circuit 1100 according to an example implementation. The graph 1200 can be formed by the dual-element packing tool 214 of the circuit design system 200 when processing the circuit 1100 for optimization. The graph 1200 includes nodes L1 through L7 representing the LUTs L1 through L7 of the circuit 1000. The graph includes edges between nodes L1 and L2, L1 and L3, L3 and L4, L2 and L4, L4 and L5, L4 and L6, L6 and L7, and L5 and L7 to represent the cascaded connections of the LUTs L1 through L7 in the circuit 1100. The dual-element packing tool 214 can process the graph 1200 according the methods described above to produce an optimal packing in terms of dual-cascaded LUT circuits of a target IC.

Figure 13:
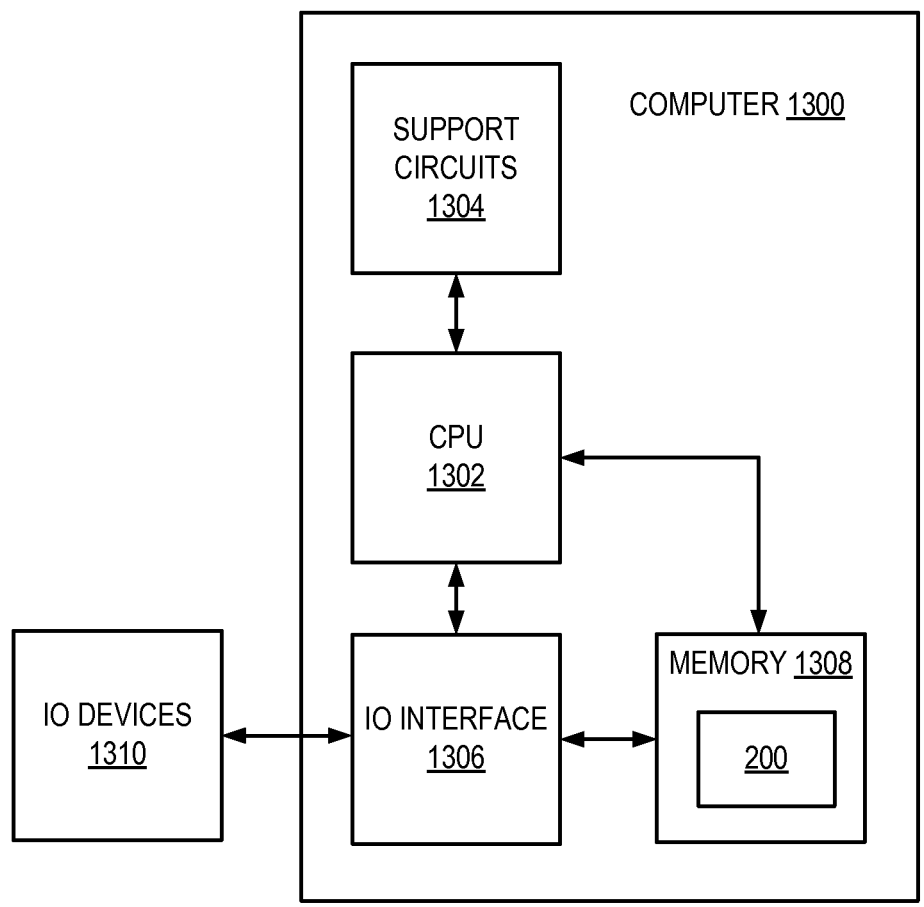
FIG. 13 is a block diagram depicting a computer suitable for implementing the methods and systems described herein.

FIG. 13 is a block diagram depicting a computer 1300 suitable for implementing the methods and systems described herein. The computer 1300 includes a central processing unit (CPU) 1302, a memory 1308, various support circuits 1304, and an IO interface 1306. The CPU 1302 can include one or more microprocessors. The support circuits 1304 can include conventional cache, power supplies, clock circuits, data registers, IO interfaces, and the like. The IO interface 1306 may be directly coupled to the memory 1308 or coupled through the CPU 1302. The IO interface 1306 can be coupled to various 10 devices 1310, such as conventional keyboard, mouse, printer, display, and the like.

The memory 1308 may store all or portions of one or more programs and/or data to implement the systems and methods described herein. For example, the memory 1308 can store programs for implementing the circuit design system 200 of FIG. 2. The memory 1308 can include one or more of random access memory (RAM), read only memory (ROM), magnetic read/write memory, and the like.

The various examples described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more examples of the disclosure may be useful machine operations. In addition, one or more examples of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a Compact Disc (CD)-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

While the foregoing is directed to specific examples, other and further examples may be devised without departing from the basic scope thereof, and the scope thereof is determined by the claims that follow.

What is claimed is:

1. A method of implementing a circuit design for an integrated circuit (IC), comprising:
    on at least one programmed processor, performing operations including: processing a description of the circuit design having logic elements into a graph having nodes representing the logic elements and edges representing potential pairs of the logic elements;
        determining a packing of pairs of the nodes to divide the graph into selected nodes and unselected nodes and selected edges and unselected edges by performing iterations of:
            identifying an augmenting path in the graph between a pair of unselected nodes; and
            modifying the selected nodes and unselected nodes and the selected edges and unselected edges based on the augmenting path; and
    grouping the logic elements in the description into pairs of logic elements based on the packing of pairs of the nodes.

2. The method of claim 1, wherein, for at least one of the iterations, the augmenting path includes an alternating sequence of unselected edges and selected edges between the pair of the unselected nodes, and wherein the step of modifying comprises:
    changing each selected edge to an unselected edge, and each unselected edge to a selected edge, in the augmenting path.

3. The method of claim 1, further comprising:
    determining an initial packing of pairs of the nodes, where the selected nodes and unselected nodes and the selected edges and unselected edges are initialized based on the initial packing.

4. The method of claim 1, wherein the step of processing the description into the graph comprises:
    assigning weights to the edges in the graph; and
    assigning values to the nodes in the graph.

5. The method of claim 4, further comprising:
    identifying tight edges of the edges in the graph where, for each tight edge of the tight edges, a sum of the values of a respective pair of nodes connected by said each tight edge equals the weight of said each tight edge;
    wherein the selected edges in the graph comprising a second packing include only tight edges.

6. The method of claim 5, further comprising:
    adjusting, for at least one of the iterations, the values of the nodes in the graph to add at least one tight edge to the tight edges.

7. The method of claim 5, wherein, for at least one of the iterations, the augmenting path includes a sequence of the tight edges.

8. The method of claim 1, wherein the logic elements include lookup tables (LUTs) and the pairs of the logic elements include dual LUTs or cascaded LUTs.

9. A computer system including a circuit design tool executing therein configured to implement a circuit design for an integrated circuit (IC), wherein the circuit design tool is programmed to:
    process a description of the circuit design having logic elements into a graph having nodes representing the logic elements and edges representing potential pairs of the logic elements;
    determine a packing of pairs of the nodes to divide the graph into selected nodes and unselected nodes and selected edges and unselected edges by performing iterations of:
        identifying an augmenting path in the graph between a pair of unselected nodes; and
        modifying the selected nodes and unselected nodes and the selected edges and unselected edges based on the augmenting path; and
    group the logic elements in the description into pairs of logic elements based on the packing of pairs of the nodes.

10. The computer system of claim 9, wherein, for at least one of the iterations, the augmenting path includes an alternating sequence of unselected edges and selected edges between the pair of the unselected nodes, and wherein the circuit design tool is programmed to modify the selected nodes and unselected nodes, and the selected edges and unselected edges, by:
    changing each selected edge to an unselected edge, and each unselected edge to a selected edge, in the augmenting path.

11. The computer system of claim 9, wherein the circuit design tool is programmed to determine an initial packing of pairs of the nodes, where the selected nodes and unselected nodes and the selected edges and unselected edges are initialized based on the initial packing.

12. The computer system of claim 9, wherein circuit design tool is programmed to process the description into the graph by:
    assigning weights to the edges in the graph; and
    assigning values to the nodes in the graph.

13. The computer system of claim 12, wherein the circuit design tool is programmed to:
    identify tight edges of the edges in the graph where, for each tight edge of the tight edges, a sum of the values of a respective pair of nodes connected by said each tight edge equals the weight of said each tight edge;
    wherein the circuit design tool is programmed to select the selected edges from only said each tight edges.

14. The computer system of claim 13, wherein the circuit design tool is programmed to:

adjust, for at least one of the iterations, the values of the nodes in the graph to add at least one tight edge to the tight edges.

15. The computer system of claim 13, wherein, for at least one of the iterations, the augmenting path includes a sequence of the tight edges.

16. A non-transitory computer-readable storage medium comprising instructions, which, when executed in a computer system, causes the computer system to carry out a method of implementing a circuit design for an integrated circuit (IC), comprising:
- processing a description of the circuit design having logic elements into a graph having nodes representing the logic elements and edges representing potential pairs of the logic elements;
  - determining a packing of pairs of the nodes to divide the graph into selected nodes and unselected nodes and selected edges and unselected edges by performing iterations of:
    - identifying an augmenting path in the graph between a pair of unselected nodes; and
    - modifying the selected nodes and unselected nodes and the selected edges and unselected edges based on the augmenting path; and
- grouping the logic elements in the description into pairs of logic elements based on the packing of pairs of the nodes.

17. The non-transitory computer-readable storage medium of claim 16, wherein, for at least one of the iterations, the augmenting path includes an alternating sequence of unselected edges and selected edges between the pair of the unselected nodes, and wherein a step of modifying comprises:
- changing each selected edge to an unselected edge, and each unselected edge to a selected edge, in the augmenting path.

18. The non-transitory computer-readable storage medium of claim 16, wherein the step of processing the description into the graph comprises:
- assigning weights to the edges in the graph; and
- assigning values to the nodes in the graph.

19. The non-transitory computer-readable storage medium of claim 18, further comprising:
- identifying tight edges of the edges in the graph where, for each tight edge of the tight edges, a sum of the values of a respective pair of nodes connected by said each tight edge equals the weight of said each tight edge;
- wherein the selected edges in the graph comprising a second packing include only tight edges.

20. The non-transitory computer-readable storage medium of claim of claim 19, further comprising:
- adjusting, for at least one of the iterations, the values of the nodes in the graph to add at least one tight edge to the tight edges.

* * * * *